(12) United States Patent
Kim et al.

(10) Patent No.: US 12,374,744 B2
(45) Date of Patent: Jul. 29, 2025

(54) BATTERY MODULE AND BATTERY PACK INCLUDING THE SAME

(71) Applicant: LG ENERGY SOLUTION, LTD., Seoul (KR)

(72) Inventors: Min Seop Kim, Daejeon (KR); Junyeob Seong, Daejeon (KR); Myungki Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 81 days.

(21) Appl. No.: 17/920,296

(22) PCT Filed: Mar. 16, 2022

(86) PCT No.: PCT/KR2022/003664
§ 371 (c)(1),
(2) Date: Oct. 20, 2022

(87) PCT Pub. No.: WO2022/270718
PCT Pub. Date: Dec. 29, 2022

(65) Prior Publication Data
US 2024/0222769 A1    Jul. 4, 2024

(30) Foreign Application Priority Data

Jun. 22, 2021 (KR) .................. 10-2021-0080813
Mar. 14, 2022 (KR) .................. 10-2022-0031526

(51) Int. Cl.
*H01M 50/224* (2021.01)
*H01M 10/613* (2014.01)
*H01M 10/6554* (2014.01)
*H01M 10/6556* (2014.01)
(Continued)

(52) U.S. Cl.
CPC ..... *H01M 50/224* (2021.01); *H01M 10/6554* (2015.04); *H01M 10/6556* (2015.04); *H01M 50/231* (2021.01); *H01M 10/613* (2015.04); *H01M 50/211* (2021.01)

(58) Field of Classification Search
CPC ............ H01M 50/224; H01M 50/231; H01M 10/6554; H01M 10/6556
See application file for complete search history.

(56) References Cited

U.S. PATENT DOCUMENTS

| | | |
|---|---|---|
| 2012/0156543 A1 | 6/2012 | Cicero et al. |
| 2016/0172726 A1 | 6/2016 | Enning et al. |
| 2017/0104252 A1 | 4/2017 | Wünsche et al. |

(Continued)

FOREIGN PATENT DOCUMENTS

| | | |
|---|---|---|
| CN | 112993458 A | 6/2021 |
| DE | 102013011895 A | 1/2015 |

(Continued)

*Primary Examiner* — Sarah A. Slifka
(74) *Attorney, Agent, or Firm* — Bryan Cave Leighton Paisner LLP

(57) ABSTRACT

A battery module and a battery pack including the same. The battery module including a battery cell stack in which a plurality of battery cells are stacked; a housing for the battery cell stack; and a heat sink located at the bottom part of the housing. The heat sink includes an upper plate and a lower plate, the upper plate of the heat sink forms a bottom part of the housing, a refrigerant flow path is formed between the bottom part and the lower plate, and the bottom part and the lower plate are formed of different metals.

19 Claims, 8 Drawing Sheets

(51) Int. Cl.
H01M 50/211 (2021.01)
H01M 50/231 (2021.01)

(56) References Cited

U.S. PATENT DOCUMENTS

| | | |
|---|---|---|
| 2018/0304390 A1 | 10/2018 | Hirayama et al. |
| 2020/0067155 A1 | 2/2020 | Hwang et al. |
| 2020/0153064 A1 | 5/2020 | Ishikawa et al. |
| 2020/0388894 A1 | 12/2020 | Heo |
| 2021/0184303 A1 | 6/2021 | Lee et al. |
| 2021/0249710 A1 | 8/2021 | Kimura et al. |
| 2022/0021048 A1 | 1/2022 | Boddakayala |
| 2022/0029220 A1 | 1/2022 | Hwang et al. |
| 2022/0102778 A1 | 3/2022 | Heo |
| 2023/0011595 A1 | 1/2023 | Jang et al. |

FOREIGN PATENT DOCUMENTS

| | | |
|---|---|---|
| DE | 102017202552 A | 8/2018 |
| EP | 3790100 A1 | 3/2021 |
| EP | 4047720 A1 | 8/2022 |
| JP | 2014504440 A | 2/2014 |
| JP | 2014-053126 A | 3/2014 |
| JP | 2015-125930 A | 7/2015 |
| JP | 2005-302698 A | 10/2016 |
| JP | 2020-077559 A | 5/2020 |
| KR | 10-2014-0077272 A | 6/2014 |
| KR | 1020150081514 | 7/2015 |
| KR | 10-2017-0041630 A | 4/2017 |
| KR | 10-2018-0038310 A | 4/2018 |
| KR | 10-2020-0021608 A | 3/2020 |
| KR | 10-2173142 B1 | 11/2020 |
| KR | 10-2020-0141157 A | 12/2020 |
| WO | 2017-073021 A1 | 10/2005 |
| WO | 2016101872 A1 | 6/2016 |
| WO | 2018088655 A1 | 5/2018 |
| WO | 2020027299 A1 | 2/2020 |
| WO | 2020121244 A1 | 2/2020 |

[FIG. 1]
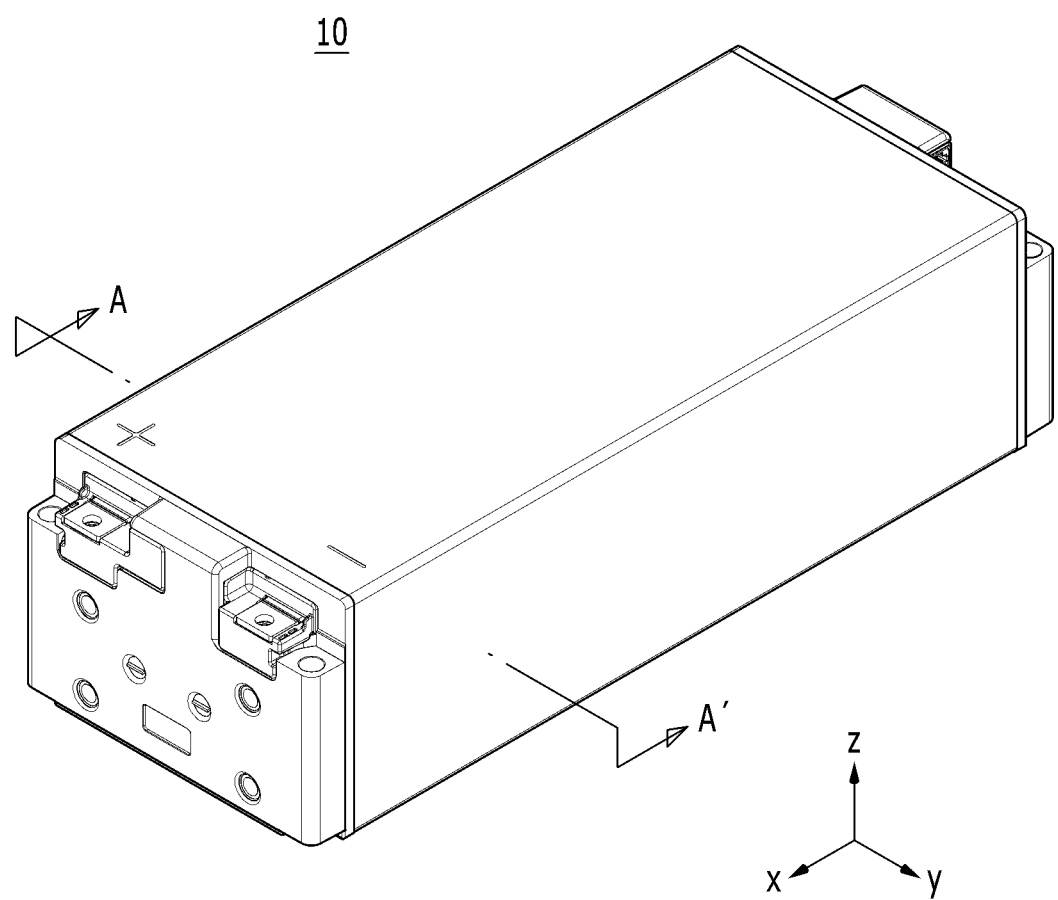

[FIG. 2]
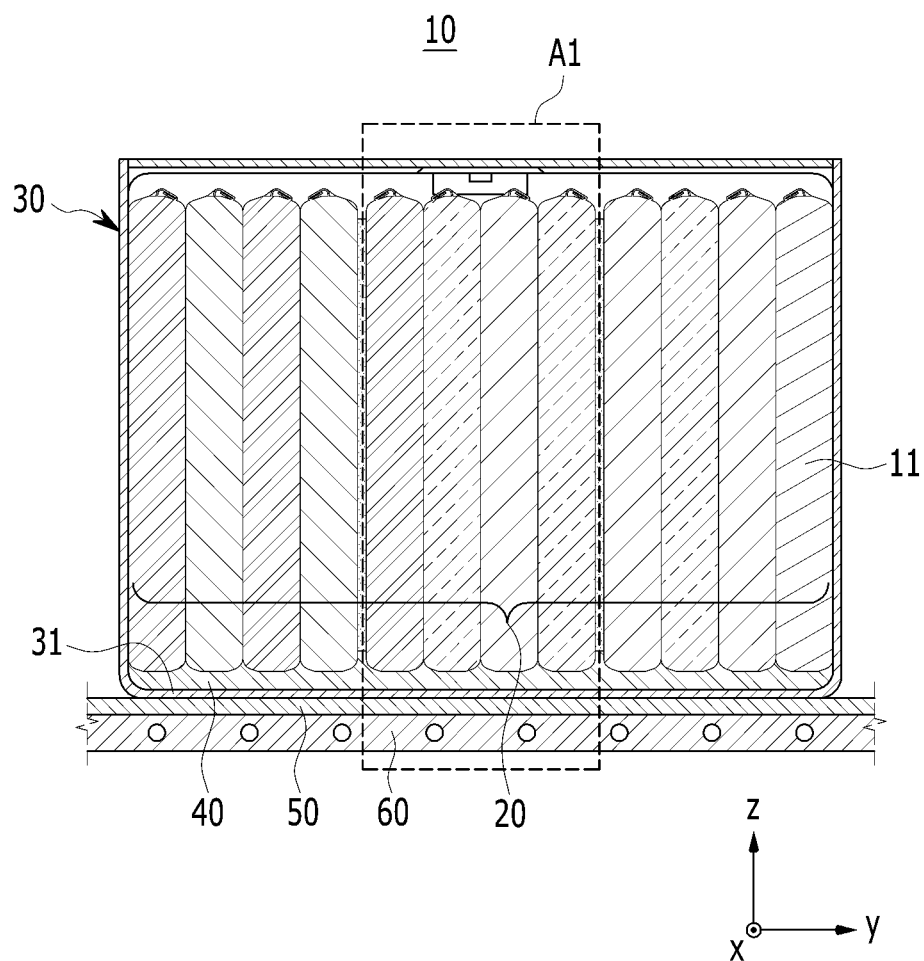

[FIG. 3]
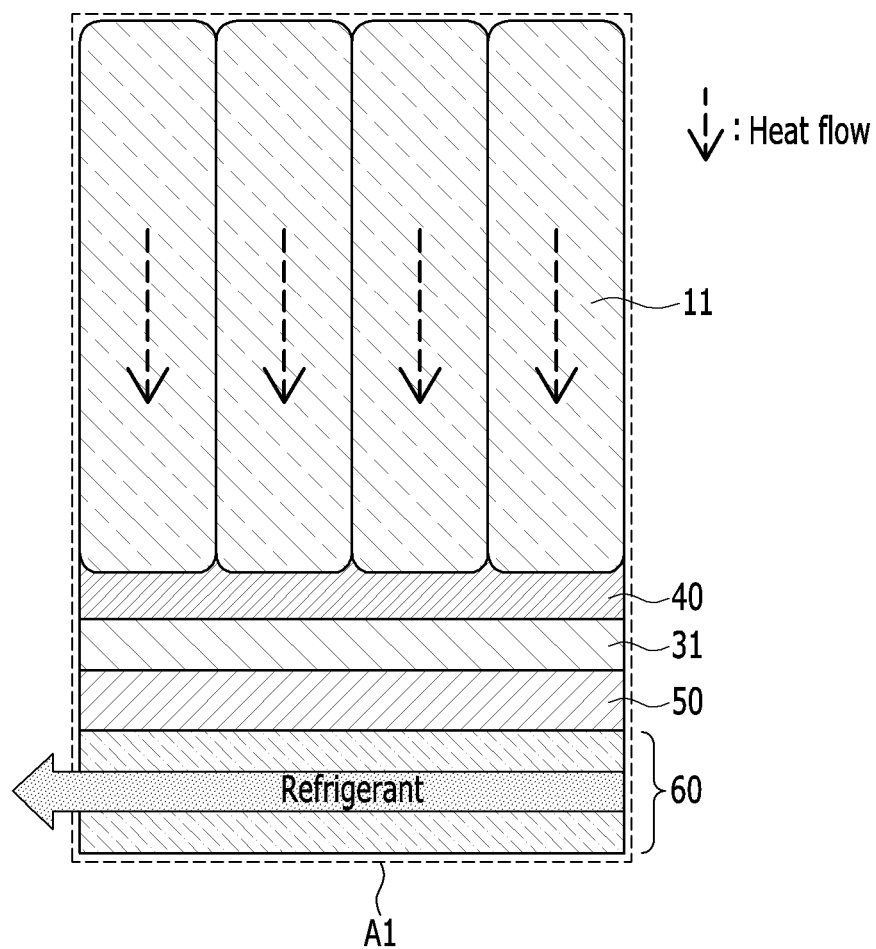

[FIG. 4]
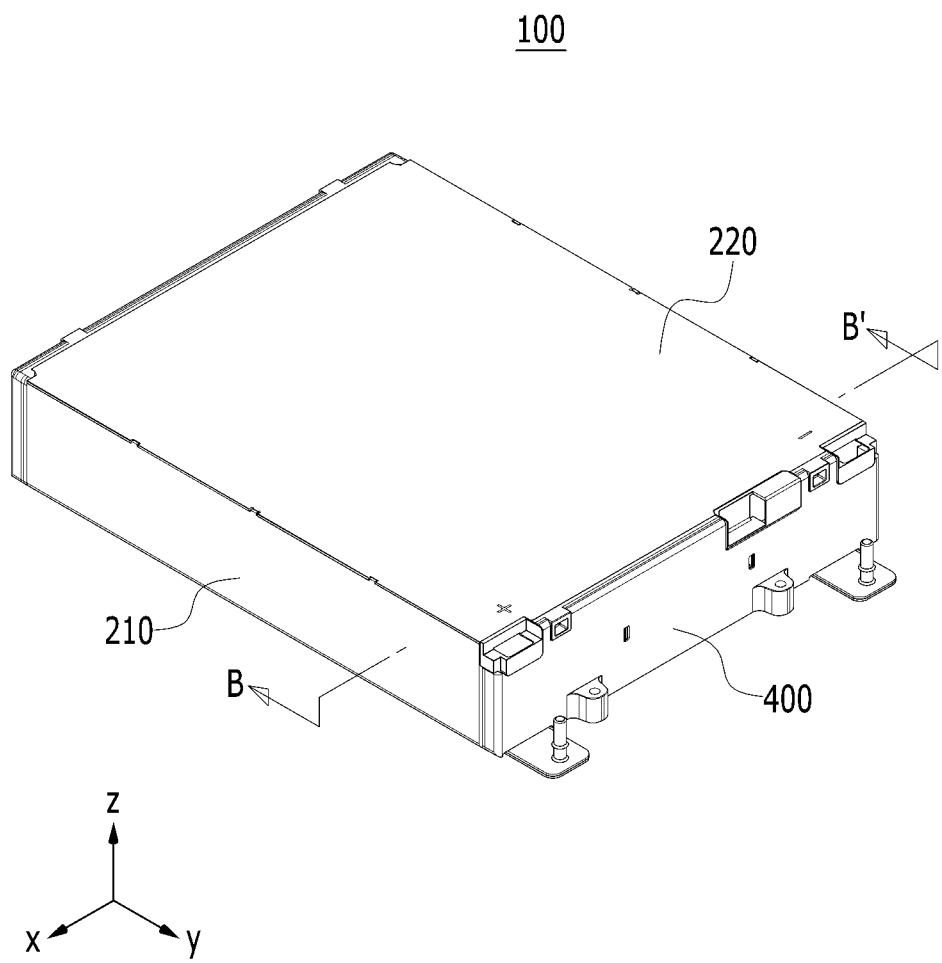

[FIG. 5]
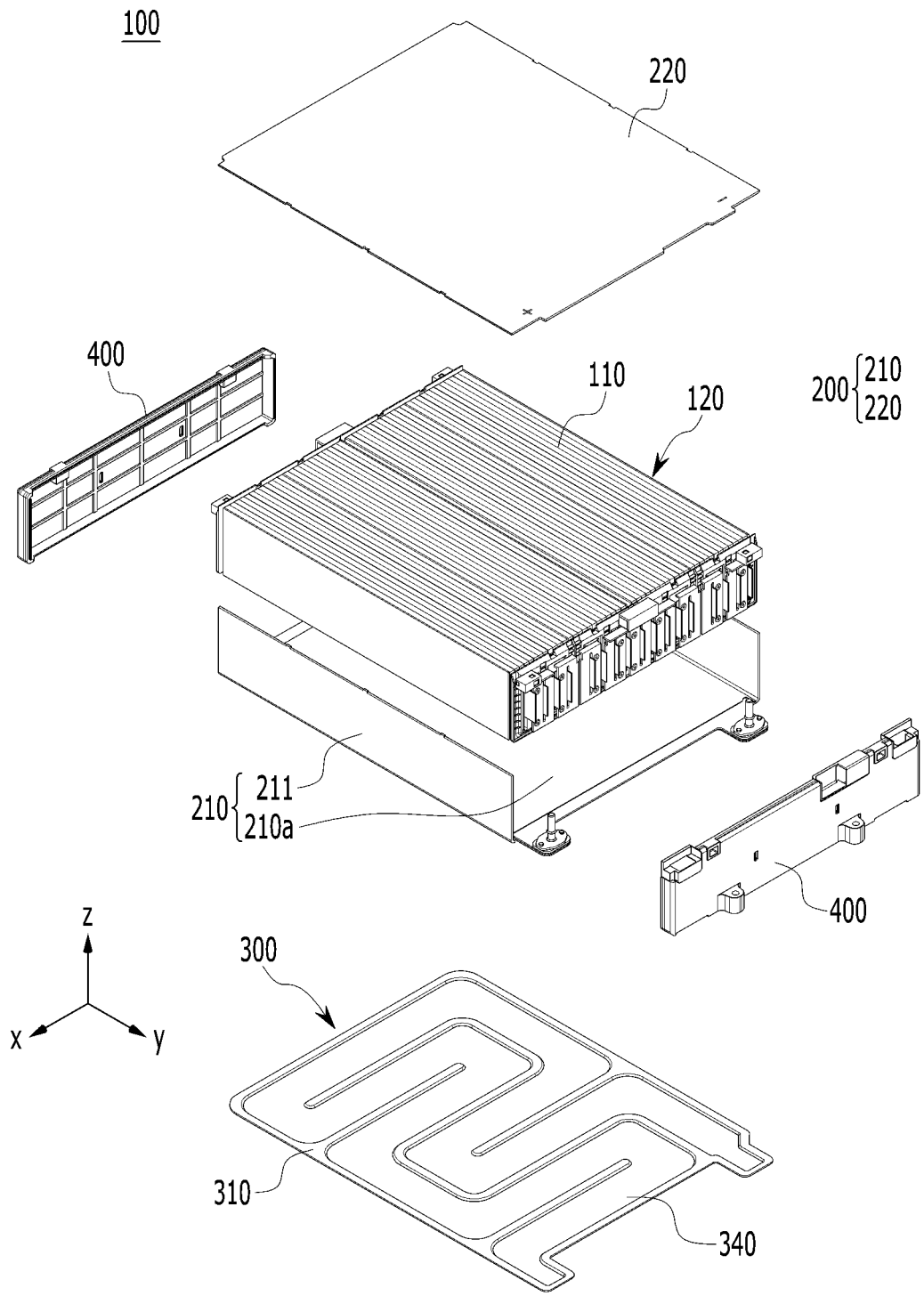

[FIG. 6]
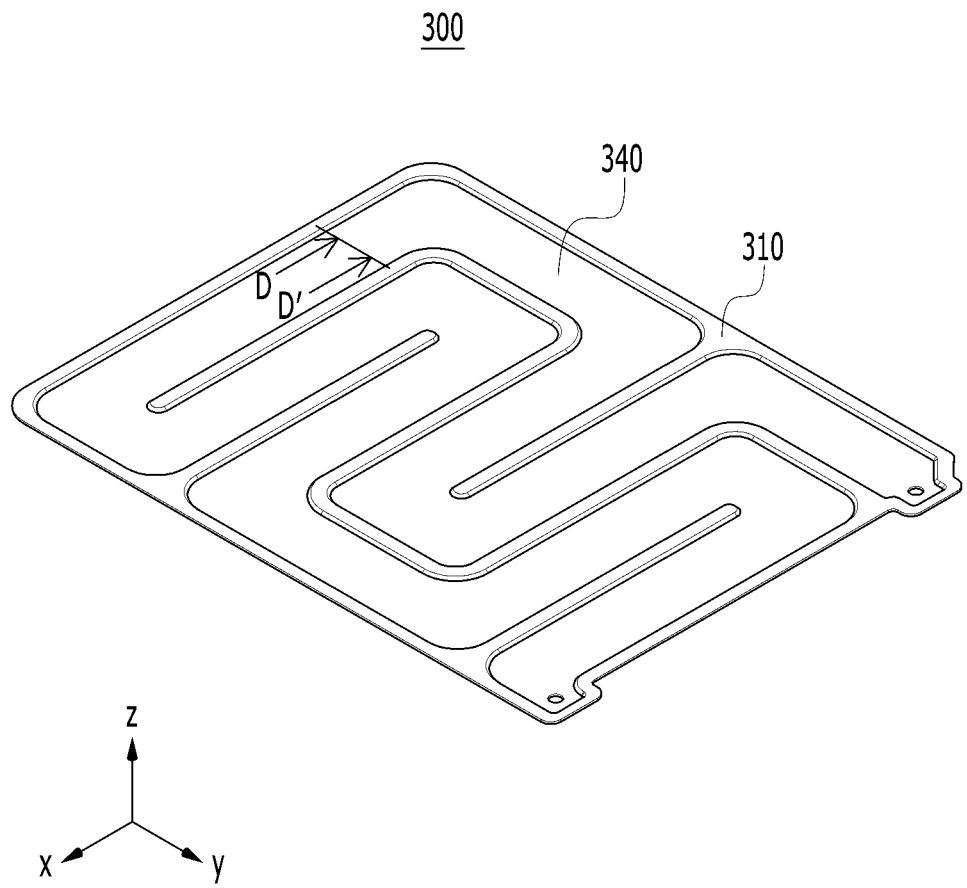
[FIG. 7]
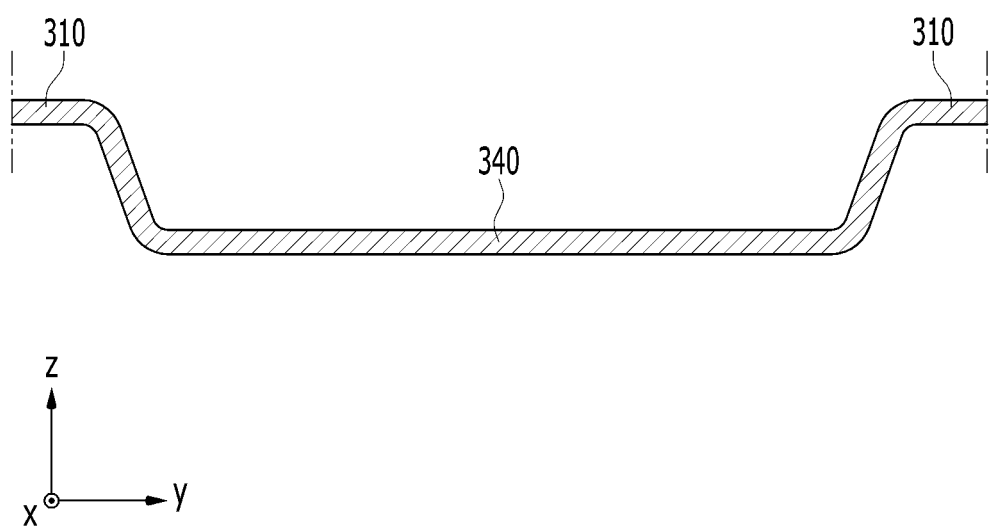

[FIG. 8]
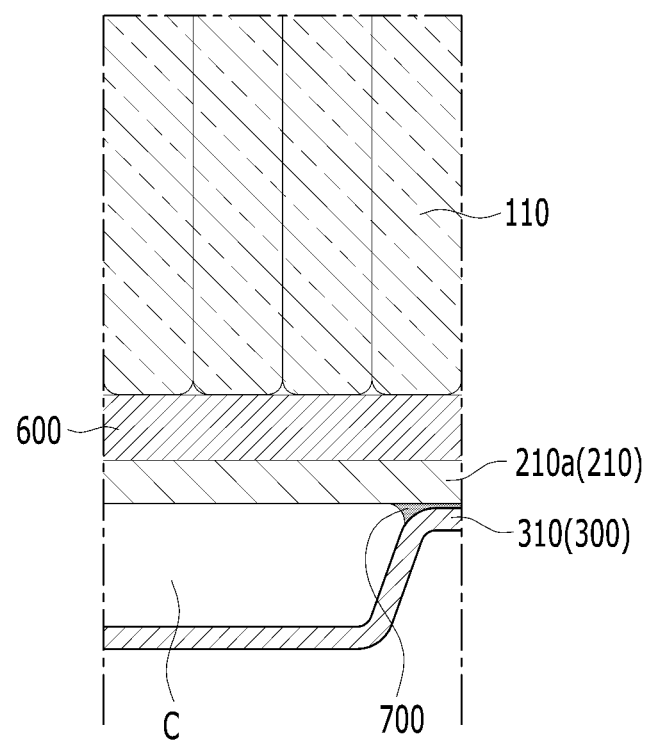

【FIG. 9】
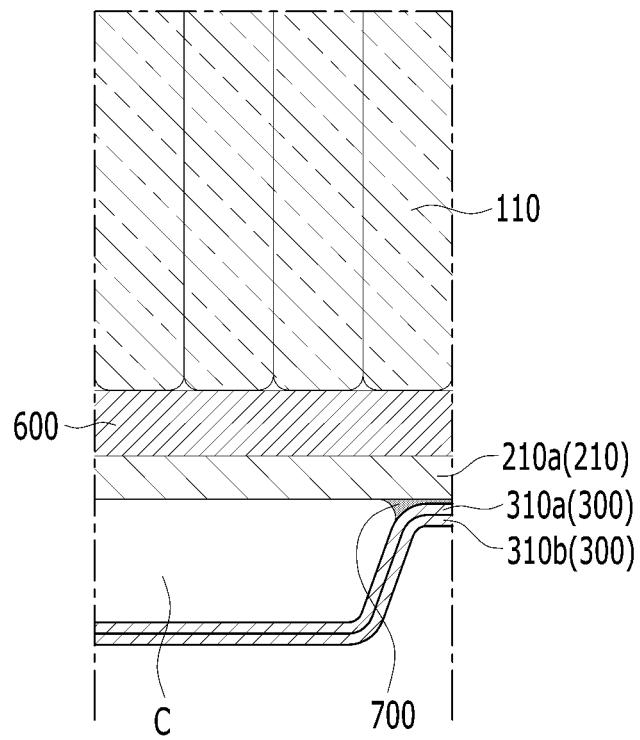
【FIG. 10】
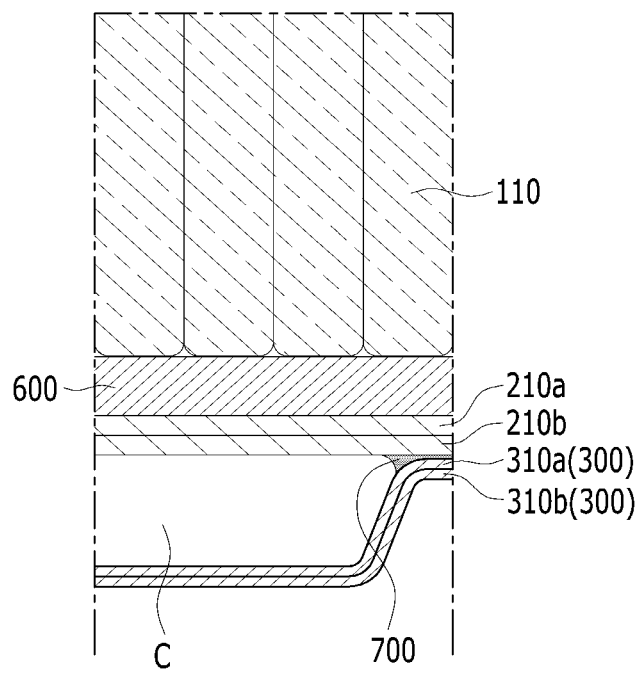

… (1) …

BATTERY MODULE AND BATTERY PACK INCLUDING THE SAME

CROSS-REFERENCE TO RELATED APPLICATIONS

This application is a US national phase of international Application No. PCT/KR2022/003664 filed Mar. 16, 2022, and claims the benefit of Korean Patent Application No. 10-2021-0080813 filed on Jun. 22, 2021 and Korean Patent Application No. 10-2022-0031526 filed on Mar. 14, 2022, the contents of which are incorporated herein by reference in their entirety.

TECHNICAL FIELD

The present disclosure relates to a battery module and a battery pack including the same, and more particularly, to a heat sink that is integrated with the housing and is formed of the housing and different metals.

BACKGROUND

In modern society, as portable devices such as a mobile phone, a notebook computer, a camcorder and a digital camera are used daily, the development of technologies in the fields related to mobile devices as described above has been activated. In addition, chargeable/dischargeable secondary batteries are used as a power source for an electric vehicle (EV), a hybrid electric vehicle (HEV), a plug-in hybrid electric vehicle (P-HEV) and the like, in an attempt to solve air pollution and the like caused by existing gasoline vehicles using fossil fuel. Therefore, there is a growing need for development of the secondary battery.

Currently, commercialized secondary batteries include a nickel cadmium battery, a nickel hydrogen battery, a nickel zinc battery, and a lithium secondary battery. Among them, the lithium secondary battery has come into the spotlight because they have advantages, for example, exhibiting very low memory effects compared to nickel-based secondary batteries and thus being freely charged and discharged, and having very low self-discharge rate and high energy density.

Such lithium secondary batteries mainly use a lithium-based oxide and a carbonaceous material as a positive electrode active material and a negative electrode active material, respectively. The lithium secondary battery includes an electrode assembly in which a positive electrode plate and a negative electrode plate, each being coated with the respective positive electrode active material and the negative electrode active material, are arranged with a separator interposed between them, and a battery case which seals and houses the electrode assembly together with an electrolyte solution.

Generally, the lithium secondary battery may be classified based on the shape of the exterior material into: a can type secondary battery, in which the electrode assembly is mounted in a metal can; and a pouch-type secondary battery, in which the electrode assembly is mounted in a pouch of an aluminum laminate sheet.

Two to three battery cells are arranged in a secondary battery used for small-sized devices, but a battery module, in which a large number of battery cells are electrically connected, is used in a secondary battery used for a medium- or large-sized device such as an automobile. In such a battery module, a large number of battery cells are connected to each other in series or parallel to form a cell assembly, thereby improving capacity and output. In addition, one or more battery modules can be mounted together with various control and protection systems such as a BMS (battery management system) and a cooling system to form a battery pack.

When the temperature of the secondary battery rises higher than an appropriate temperature, the performance of the secondary battery may deteriorate, and in the worst case, there is also a risk of an explosion or ignition. In particular, the heat generated from the large number of battery cells in a narrow space in a battery module or a battery pack can add up and cause the temperature can rise more quickly and excessively, and it can be difficult to remove heat generated from the battery cells during charging and discharging. When the heat dissipation of the battery cell is not properly performed, deterioration of the battery cells is accelerated, the lifespan is shortened, and the possibility of explosion or ignition increases.

Moreover, a battery module included in a vehicle battery pack is frequently exposed to direct sunlight and may be placed under high-temperature conditions such as summer or desert areas.

Therefore, when a battery module or a battery pack is configured, it may be very important to stably and effectively ensure cooling performance of the battery module or the battery pack.

FIG. 1 is a perspective view of a conventional battery module. FIG. 2 is a cross-section taken along the line A-A' of FIG. 1.

As illustrated in FIGS. 1 and 2, the conventional battery module 10 is configured such that a plurality of battery cells 11 are stacked to form a battery cell stack 20, and the battery cell stack 20 is housed in the housing 30.

As described above, since the battery module 10 includes a plurality of battery cells 11, it generates a large amount of heat in a charge and discharge process. As a cooling means, the battery module 10 may include a thermal conductive resin layer 40 located between the battery cell stack 20 and the bottom part 31 of the housing 30.

Further, when the battery module 10 is mounted on the pack frame to form a battery pack, a heat transfer member 50 and a heat sink 60 may be sequentially located below the battery module 10. The heat transfer member 50 may be a heat dissipation pad, and the heat sink 60 may have a refrigerant flow path formed therein.

FIG. 3 is an enlarged view of a region A1 of FIG. 2.

As illustrated in FIGS. 1 to 3, the heat generated from the plurality of battery cells 11 sequentially passes through a thermal conductive resin layer 40, a bottom part 31 of a housing 30, a heat transfer member 50, and a heat sink 60 along the direction toward the heat sink 60 to be transferred to the outside of the battery module 10. In the case of the conventional battery module 10, the heat transfer path is complicated as described above, which makes it difficult to effectively transfer the heat generated from the battery cell 11 to the outside. In particular, the housing 30 itself may deteriorate the heat conduction characteristics, and a fine air layer such as an air gap that can be formed between each of the housing 30, the heat transfer member 50 and the heat sink 60 may also deteriorate the heat conduction characteristics.

Therefore, where requirements for the battery module such as the increase in capacity continues to increase, it is practically necessary to develop a battery module that can meet these various requirements together while improving the cooling performance.

SUMMARY

It is an objective of the present disclosure to provide a battery module that simplifies the cooling structure, thereby improving the cooling performance and increasing the rate of space utilization, and a battery pack including the same.

However, the problem to be solved by the embodiments of the present disclosure is not limited to the above-described problems, and can be variously expanded within the scope of the technical idea included in the present disclosure.

According to one embodiment of the present disclosure, there is provided a battery module comprising: a battery cell stack in which a plurality of battery cells are stacked; a housing for housing the battery cell stack; and a heat sink located at the bottom part of the housing, wherein the heat sink comprises an upper plate and a lower plate, wherein the upper plate of the heat sink constitutes a bottom part of the housing, wherein a refrigerant flow path is formed between the bottom part and the lower plate, and wherein the bottom part and the lower plate are formed of different metals.

The bottom part and the lower plate may be formed of aluminum materials which are different.

The bottom part may include a first material containing Mg, and the lower plate may include a second material containing Si and a third material containing Mn.

The first material may be an aluminum alloy containing Mg, Si, Cu and Mn.

The second material may be an aluminum alloy containing Si.

The third material may be an aluminum alloy containing Mn, Mg and Cu.

The first material may be an aluminum alloy containing Mg, Si, Cu and Mn, and the third material may be an aluminum alloy containing Mn, Mg and Cu, and a content of Mg contained in the first material may be larger than a content of Mg contained in the third material.

The lower plate has a structure in which two layers are stacked and may include a first lower plate and a second lower plate.

The first lower plate has a structure stacked on the second lower plate, wherein one surface of the first lower plate may be located opposite to the bottom part, and one surface of the second lower plate may be in contact with the other surface of the first lower plate.

The bottom part may include a first material containing Mg, the first lower plate may include a second material containing Si, and the second lower plate may include a third material containing Mn.

The bottom part may further include an auxiliary layer which is located between a layer formed of a first material containing Mg and the lower plates.

The auxiliary layer may be formed of a third material containing Mn.

The bottom part and the lower plate may be joined by melting a metal located between the bottom part and the lower plate.

The battery module may further include a clad layer located between the bottom part and the lower plate.

The clad layer may have a lower melting point than the materials constituting the bottom part and the lower plate.

The clad layer may include aluminum.

The bottom part includes a first material containing Mg, the lower plate includes a first lower plate including a second material containing Si and a second lower plate comprising a third material containing Mn, and the first lower plate may be stacked and located on the second lower plate.

The flux used for joining the bottom part and the lower plate may include cesium (Cs).

According to another embodiment of the present disclosure, there is provided a battery pack comprising the above-mentioned at least one battery module, and a pack case for packaging the at least one battery module.

According to embodiments of the present disclosure, the heat sink is integrated with the housing, thereby capable of improving the cooling performance of the formed battery module and the battery pack including the same, increasing the rate of space utilization and reducing the manufacturing cost.

Additionally, the bottom part of the housing constituting the heat sink and the lower plate joined thereto are formed of different types of metal series, thereby improving the cooling performance.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a perspective view of a conventional battery module;

FIG. 2 is a cross-section along the line A-A' of FIG. 1;

FIG. 3 is an enlarged view of a region A1 of FIG. 2;

FIG. 4 is a perspective view of a battery module according to an embodiment of the present disclosure;

FIG. 5 is an exploded perspective view of the battery module of FIG. 4;

FIG. 6 is a perspective view of a heat sink included in the battery module of FIG. 4;

FIG. 7 is a cross-sectional view along the line D-D' of FIG. 6;

FIG. 8 is a cross-sectional view of a battery module according to an embodiment of the present disclosure when viewed along the line B-B' of FIG. 4;

FIG. 9 is a cross-sectional view of a battery module according to another embodiment of the present disclosure when viewed along the line B-B' of FIG. 4; and FIG. 10 is a cross-sectional view of a battery module according to another embodiment of the present disclosure when viewed along the line B-B' of FIG. 4.

DETAILED DESCRIPTION

Hereinafter, various embodiments of the present disclosure will be described in detail with reference to the accompanying drawings so that those skilled in the art can easily carry out the inventions described herein. The present disclosure may be modified in various different ways, and is not limited to the embodiments set forth herein.

Portions that are irrelevant to the description will be omitted to clearly describe the present disclosure, and same reference numerals designate same or like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above"

means arranged on or below a reference portion, and does not necessarily mean being arranged on the upper end of the reference portion toward the opposite direction of gravity.

Further, throughout the description, when a portion is referred to as "including" or "comprising" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

FIG. 4 is a perspective view of a battery module according to an embodiment of the present disclosure. FIG. 5 is an exploded perspective view of the battery module of FIG. 4. FIG. 6 is a perspective view of a heat sink included in the battery module of FIG. 4. FIG. 7 is a cross-sectional view along the line D-D' of FIG. 6.

As illustrated in FIGS. 4 to 7, the battery module 100 according to an embodiment of the present disclosure includes a battery cell stack 120 in which a plurality of battery cells 110 are stacked, a housing 200 for housing the battery cell stack 120, and a heat sink 300 located below the bottom part 210a of the housing 200. The bottom part 210a of the housing 200 constitutes an upper plate of the heat sink 300, and the recessed part 340 of the heat sink 300 and the bottom part 210a form a refrigerant flow path. The specific structure of the heat sink 300 will be described later in detail with reference to FIGS. 6 and 7.

First, the battery cells 110 may be preferably pouch-type battery cells. The pouch-type battery cells can be manufactured by housing the electrode assembly in a pouch made of a laminated sheet including a resin layer and a metal layer, and then heat-sealing a sealing part of the pouch. The battery cells 110 may be formed in a rectangular sheet-like structure.

A plurality of battery cells 110 may be formed, and the plurality of battery cells 110 are stacked to be electrically connected to each other to form a battery cell stack 120. In particular, as shown in FIG. 5, a plurality of battery cells 110 may be stacked along a direction parallel to the x-axis.

The housing 200 for housing the battery cell stack 120 may include an upper cover 220 and a U-shaped frame 210.

The U-shaped frame 210 may include a bottom part 210a and two side parts 211 extending upward from two ends of the bottom part 210a. The bottom part 210a may cover the lower surface (-z-axis direction) of the battery cell stack 120, and the side parts 211 may cover both side surfaces (x-axis direction and -x-axis direction) of the battery cell stack 120.

The upper cover 220 may be formed in a single plate-shaped structure that covers the lower surface covered by the U-shaped frame 210 and the remaining upper surface (z-axis direction) while excluding two open side surfaces. The upper cover 220 and the U-shaped frame 210 can be joined by welding or the like in a state in which the corresponding corner portions are in contact with each other, thereby forming a structure that covers the battery cell stack 120 vertically and horizontally. The battery cell stack 120 can be physically protected through the upper cover 220 and the U-shaped frame 210. For this purpose, the upper cover 220 and the U-shaped frame 210 may include a metal material having a predetermined strength.

Meanwhile, although not specifically shown in the figure, the housing 200 according to a modification may be a mono frame in the form of a metal plate in which the upper part, the lower part, and both side parts are integrated. That is, this is not a structure in which the U-shaped frame 210 and the upper cover 220 are coupled with each other, but a structure in which the upper part, the lower part, and two side parts are integrated by being manufactured by extrusion molding.

A pair of end plates 400 may be located on the open first side (y-axis direction) and the second side (-y-side direction) of the housing 200, so that it may be formed to cover the battery cell stack 120. The end plates 400 can physically protect the battery cell stack 120 and other electronic components from external impact.

Although not specifically shown in the figure, a busbar frame mounted with a busbar, an insulating cover for electrical insulation, and the like may be located between the battery cell stack 120 and the end plates 400.

Next, a heat sink according to the present embodiment will be described in detail with reference to FIGS. 5 to 7.

As described above, the bottom part 210a of the housing 200 constitutes the upper plate of the heat sink 300, and the recessed part 340 of the heat sink 300 and the bottom part 210a of the housing 200 can form a refrigerant flow path C (shown in FIG. 8).

Specifically, the heat sink 300 may be formed at the lower part of the housing 200 while making contact with the bottom part 210a of the housing 200. The heat sink 300 includes a lower plate 310 that forms a skeleton of the heat sink 300 and is joined to the bottom part 210a of the housing 200 and a recessed part 340 that is a path through which refrigerant flows.

The bottom part 210a of the housing 200 is not particularly limited, but may include a metal material. The bottom part 210a may include a first material including a metal material. The first material may include a material having high rigidity. The first material may include a material having a high Mg content. The first material may be an alloy material containing Al, Mg, Si, Cu, and Mn. The first material may include an Al60-based material. That is, the bottom part 210a may include the first material to strengthen the battery module.

The bottom part 210a of the housing 200 is composed of an upper plate of the heat sink 300, and the bottom part 210a comes into direct contact with the refrigerant. Therefore, there is an advantage that more direct cooling by the refrigerant is possible. Through a structure in which the heat sink 300 is integrated with the bottom part 210a of the housing 200, the space utilization rate on the battery module 100 and the battery pack on which the battery module 100 is mounted can be further improved. This can be distinguished from the conventional case, shown in FIGS. 2 and 3, in which the upper configuration of the heat transfer member 50 and the heat sink 60 is located between the bottom part 31 and the refrigerant to indirectly cool the battery cell stack, thereby causing deterioration of the cooling efficiency.

The recessed part 340 of the heat sink 300 corresponds to a portion formed such that the lower plate 310 is recessed downward. The recessed part 340 may be a tube having a U-shaped cross section cut in an xy plane vertically with respect to the direction in which the refrigerant flow path extends, and the bottom part 210a may be located on the open upper side of the U-shaped tube.

More specifically, as shown in FIG. 6 and FIG. 7, the recessed part 340 is a tube having a U-shaped cross section cut in the yz plane or the xz plane, and may be open at the upper part. While the lower plate 310 of the heat sink 300 comes into contact with the bottom part 210a, the space between the recessed part 340 and the bottom part 210a is a region where the refrigerant flows, that is, the refrigerant flow path C. Thereby, the bottom part 210a of the housing 200 may be brought into contact with the refrigerant. The refrigerant is a medium for cooling, and is not particularly limited, but may be cooling water.

The method for manufacturing the recessed part 340 of heat sink 300 is not particularly limited, but it can be formed by providing a structure recessed with respect to the plate-shaped heat sink 300. As an example, a part of the lower plate 310 may be recessed in the lower direction to form the U-shaped recessed part 340 of which the upper side is opened.

For effective cooling, as shown in FIG. 5, it is preferable that the recessed part 340 is formed over the entire area corresponding to the bottom part 210a of the housing 200. For this purpose, the recessed part 340 may be bent at least once to extend from one side to the other. In particular, the recessed part 340 is preferably bent several times to form the recessed part 340 over the entire area corresponding to the bottom part 210a of the housing 200. As the refrigerant moves from the start point to the end point of the refrigerant flow path formed over the entire region corresponding to the bottom part 210a of the housing 200, efficient cooling can be performed over the entire region of the battery cell stack 120, and thus the cooling performance can be further improved.

Meanwhile, as will be described later, the bottom part 210a of the housing 200 can be joined to a portion of the lower plate 310, in which the recessed part 340 is not formed in the heat sink 300, by welding. In the present embodiment, the bottom part 210a of the housing 200 corresponds to the upper plate of the heat sink 300, so that a cooling integrated structure can be realized and the efficiency due to direct cooling can be increased. In addition, it can have the effect of supporting the load of the battery cell stack 120 housed in the housing 200 and reinforcing the rigidity of the battery module 100.

At this time, the lower plate 310 may include a metal material. The lower plate 310 may be made of an aluminum alloy material.

A thermal conductive resin layer 600 (shown in FIG. 6) including a thermal conductive resin may be located between the bottom part 210a of the housing 200 and the battery cell stack 120. The thermal conductive resin layer 600 may be formed by applying a thermal conductive resin to the bottom part 210a and curing the applied thermal conductive resin.

The thermal conductive resin may include a thermal conductive adhesive material, and specifically, may include at least one of a silicone material, a urethane material, and an acrylic material. The thermal conductive resin is a liquid during application but is cured after application, so that it can perform the role of fixing one battery cell 110 constituting the battery cell stack 120. Further, since the thermal conductive resin has excellent heat transfer properties, heat generated from the battery cells 110 can be quickly transferred to the outside of the battery module 100.

Heat generated from the battery cells 110 can pass through a thermal conductive resin layer 600 located between the battery cell stack 120 and the bottom part 210a, the bottom part 210a of the housing 200 and the refrigerant, and then can be transferred to the outside of the battery module 100. By removing the unnecessary cooling structure according to the conventional battery module, the heat transfer path can be simplified and an air gap between respective layers can be reduced, so that the cooling efficiency or performance can be enhanced.

Further, through the removal of the unnecessary cooling structure, the height of the battery module 100 is reduced and thus, the cost can be reduced and the space utilization rate can be increased. Furthermore, since the battery module 100 can be disposed in a compact manner, the capacity or output of the battery pack 1000 including a plurality of battery modules 100 can be increased.

Next, the joining of the bottom part 210a of the housing 200 and the lower plate 310 of the heat sink 300 will be described in detail with reference to FIG. 8.

FIG. 8 is a cross-sectional view of a battery module according to an embodiment of the present disclosure when viewed along the line B-B' of FIG. 4.

As illustrated in FIG. 8, as described above, the bottom part 210a can be joined to the lower plate 310 of the heat sink 300 by a welding method. The bottom part 210a and the lower plate 310 of the heat sink 300 may be joined by placing a metal between the bottom part 210a and the lower plate 310 and melting the metal. For example, brazing welding using a clad metal can be used. Brazing welding is a method in which a low-melting-point metal is provided between metal materials and the metal materials are joined without melting to join two different metals. By the above-mentioned welding, the clad layer 700 can be formed between the bottom part 210a and the lower plate 310. The clad layer 700 may include a material having a melting point of 600° C. or less. The clad layer 700 may include aluminum or an alloy containing aluminum.

The bottom part 210a of the housing 200 and the lower plate 310 of the heat sink 300 are sealed by welding, whereby the refrigerant can flow without leakage in the recessed part 340 formed inside the lower plate 310, and thus the cooling efficiency can be improved.

FIG. 9 is a cross-sectional view of a battery module according to another embodiment of the present disclosure when viewed along the line B-B' of FIG. 4. The battery module according to another embodiment of the present disclosure may be a modification of the battery module according to the embodiment of the present disclosure shown in FIG. 8. Therefore, only the parts that are different from rom those in FIG. 8 will be described in detail below.

As illustrated in FIG. 9, the lower plate 310 of the heat sink 300 may include a first lower plate 310a and a second lower plate 310b. The lower plate 310 may have a stacked structure. Specifically, it may have a structure in which the first lower plate 310a is stacked on the second lower plate 310b. Specifically, one surface of the first lower plate 310a is located opposite to the bottom part 210a, and the other surface of the first lower plate 310a may be in contact with one surface of the second lower plate 310b.

The first lower plate 310a is not particularly limited, but may include a metal material. The first lower plate 310a may include a second material including a metal material. The second material may include a material having a high Si content. The second material may be an alloy material containing Al and Si. The second material may include an Al40-based material. The first lower plate 310a can include a material having a melting point lower than the melting point of the material constituting the bottom part 210a of the housing 200 to improve the degree of joining with the bottom part 210a of the housing 200. The second material may be a material for welding.

The second lower plate 310b is not particularly limited, but may include a metal material. The second lower plate 310b may include a third material containing a metal material. The third material may include a material having a high Mn content. The third material may be an alloy material containing Al, Mn, Mg, and Cu. The third material may include an Al30-based material.

The bottom part 210a of the housing 200 including the first material can be joined to the first lower plate 310a including the second material by welding. The bottom part 210a of the housing 200 including the first material can be joined to the first lower plate 310a including the second material by melting aluminum. The bottom part 210a of the housing 200 including the first material can be joined to the first lower plate 310a including the second material by brazing welding.

The second material constituting the first lower plate 310a can be for forming the clad layer 700 in welding. That is, since the material constituting the second material may be a kind of clad material, joining force between the bottom part 210a and the first lower plate 310a can be improved. However, in this case, micro cracks can occur during welding due to the content of Mg contained in the first material, and thus a change in flux may be required. The flux is a substance used to protect the surface of the weld metal from the atmosphere and clean the surface during welding. The flux used for joining the bottom part 210a of the battery module and the first lower plate 310a according to an embodiment of the present disclosure may include cesium (Cs).

FIG. 10 is a cross-sectional view of a battery module according to another embodiment of the present disclosure when viewed along the line B-B' of FIG. 4. The battery module according to another embodiment of the present disclosure may be a modification of the battery module according to another embodiment of the present disclosure shown in FIG. 9. Therefore, only the parts that are different from those in FIG. 9 will be described in detail below.

The bottom part 210a of the housing 200 may have a stacked structure. The bottom part 210a of the housing 200 may further include an auxiliary layer 210b located between the bottom part 210a and the lower plate 310. That is, the bottom part 210a of the housing 200 may be formed by stacking the bottom part 210a on the auxiliary layer 210b.

The bottom part 210a of the housing 200 may include a first material, and the auxiliary layer 210b may include a third material.

Both the first material and the third material may include Mg, and the content of Mg contained in the first material may be larger than the content of Mg contained in the third material. Therefore, the strength of the first material may be larger than that of the third material due to the difference in the Mg content, but the joining force can be smaller.

By further including an auxiliary layer 210b in the bottom part 210a of the housing 200, the joining process with the lower plate 310 can be improved. When the auxiliary layer 210b including the third material is joined to the first lower plate 310a including the second material by welding, due to the difference in Mg content between the first lower plate 310a and the auxiliary layer 210b, microcracks may occur even though the appearance of microcracks may be less than that of the embodiment of FIG. 9, and a change of the flux may be unnecessary. The flux used for joining the auxiliary layer 210b and the first lower plate 310a may not contain cesium (Cs), so that the process cost is reduced, and a joining process between the auxiliary layer 210b and the lower plate 310 of the heat sink 300 can be improved.

The above-mentioned battery module and the battery pack including the same can be applied to various devices. Such a device can be applied to a vehicle means such as an electric bicycle, an electric vehicle, or a hybrid vehicle, but the present disclosure is not limited thereto, and is applicable to various devices that can use a battery module and a battery pack including the same, which also falls within the scope of the present disclosure.

Although preferred embodiments of the present disclosure have been described in detail above, the scope of the present disclosure is not limited thereto, and various modifications and improvements made by those skilled in the art using the basic concepts of the present disclosure, which are defined in the appended claims, also fall within the scope of the present disclosure.

The invention claimed is:

1. A battery module comprising:
a battery cell stack comprising a plurality of battery cells;
a housing for the battery cell stack; and
a heat sink located at a bottom part of the housing,
wherein the heat sink comprises an upper plate and a lower plate,
wherein the upper plate of the heat sink forms the bottom part of the housing,
wherein a refrigerant flow path is formed between the bottom part of the housing and the lower plate of the heat sink, and
wherein a first material of the bottom part of the housing is different from a second material of the lower plate of the heat sink.

2. The battery module of claim 1, wherein:
The first material of the bottom part and the second material of the lower plate comprise different aluminum materials.

3. The battery module of claim 1, wherein:
the first material of the bottom part comprises Mg, and
the lower plate further comprises a third material, and
the second material of the lower plate comprises Si and the third material of the lower plate comprises Mn.

4. The battery module of claim 3, wherein:
the first material is an aluminum alloy containing Mg, Si, Cu and Mn.

5. The battery module of claim 3, wherein:
the second material is an aluminum alloy containing Si.

6. The battery module of claim 3, wherein:
the third material is an aluminum alloy containing Mn, Mg and Cu.

7. The battery module of claim 3, wherein:
the first material is an aluminum alloy containing Mg, Si, Cu and Mn, and the third material is an aluminum alloy containing Mn, Mg and Cu, and
an amount of Mg in the first material is higher than an amount of Mg in the third material.

8. The battery module of claim 1, wherein:
the lower plate comprises a first lower plate and a second lower plate, and
the first lower plate and the second lower plate are stacked.

9. The battery module of claim 8, wherein:
the first lower plate is stacked on the second lower plate,
a first surface of the first lower plate is located opposite to the bottom part of the housing, and
a surface of the second lower plate is in contact with a second surface of the first lower plate that is opposite to the first surface of the first lower plate.

10. The battery module of claim 8, wherein:
the first material of the bottom part comprises Mg,
the first lower plate comprises the second material, and the second material comprises Si, and
the second lower plate comprises a third material, and the third material comprises Mn.

11. The battery module of claim 8, further comprising:
an auxiliary layer located between the bottom part of the housing and the first and second lower plates, wherein the first material of the bottom part comprises Mg.

12. The battery module of claim 11, wherein:
a fourth material of the auxiliary layer comprises Mn.

13. The battery module of claim 1, further comprising:
a flux layer between the bottom part of the housing and the lower plate of the heat sink,
wherein the bottom part and the lower plate are joined by melting the flux layer.

14. The battery module of claim 13, further comprising:
a clad layer located between the bottom part and the lower plate.

15. The battery module of claim 14, wherein:
a material of the clad layer has a melting point that is lower than the first and second materials of the bottom part and the lower plate.

16. The battery module of claim 14, wherein:
the clad layer comprises aluminum.

17. The battery module of claim 13, wherein:
the first material of the bottom part comprises Mg,
the lower plate comprises a first lower plate and a second lower plate,
the first lower plate comprises the second material, wherein the second material comprises Si, and
the second lower plate comprises a third material, wherein the third material comprises Mn,
the first lower plate is positioned on the second lower plate, and
the batter module further comprises a clad layer, wherein the clad layer comprises the second material.

18. The battery module of claim 13, wherein:
the flux layer comprises cesium (Cs).

19. A battery pack comprising:
at least one battery module as set forth in claim 1, and
a case for packaging the at least one battery module.

* * * * *